United States Patent Office 2,716,462
Patented Aug. 30, 1955

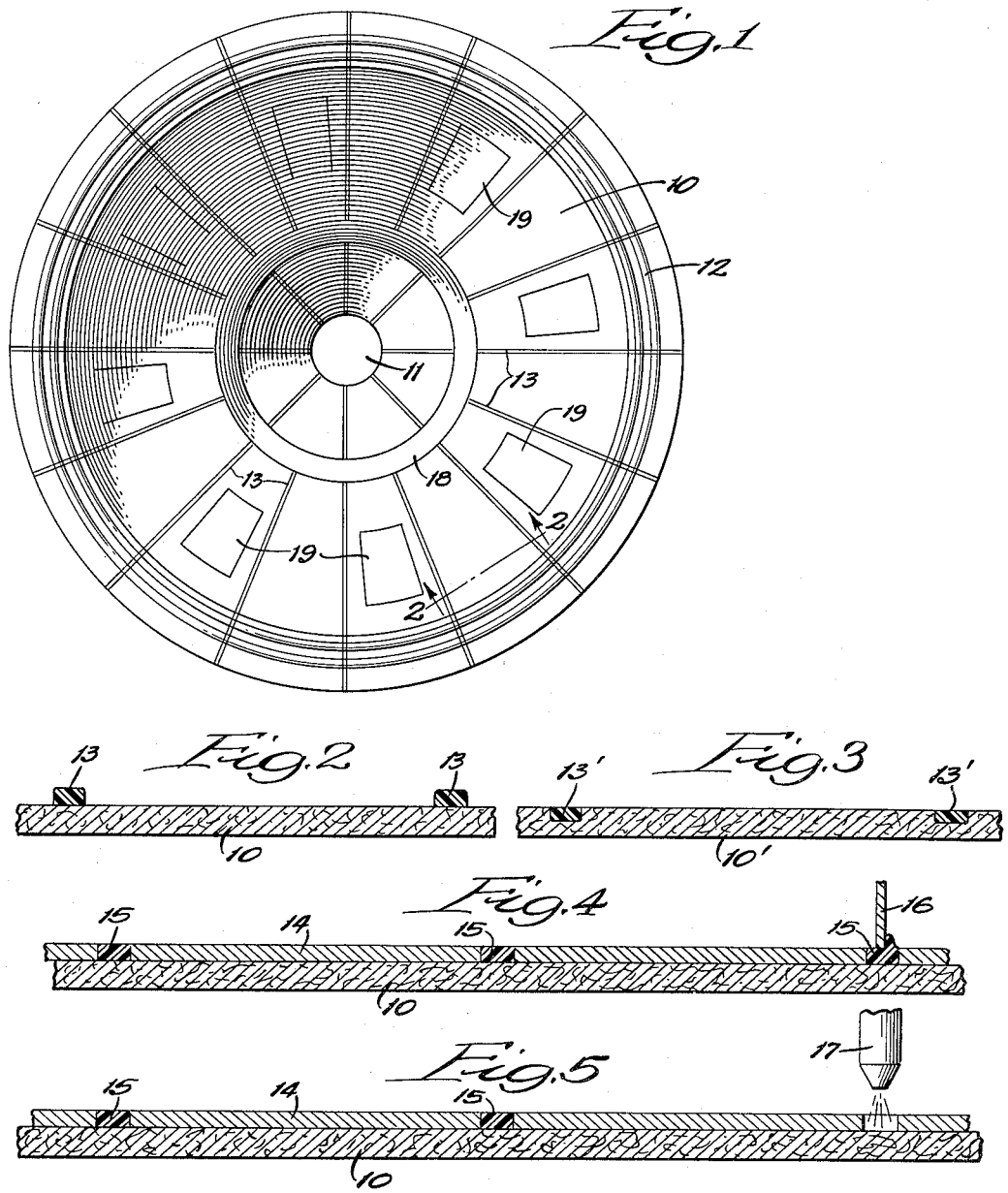

2,716,462

REINFORCED ACOUSTIC DIAPHRAGMS AND METHOD OF MAKING THE SAME

Joseph B. Brennan, Cleveland, Ohio

Application October 25, 1952, Serial No. 316,874

10 Claims. (Cl. 181—32)

This invention relates to reinforced acoustic diaphragms and method of making the same, and more particularly to the manufacture of flexible concave diaphragms of the type used in loud speakers.

In my copending application Serial Number 729,846, filed February 20, 1947, now Patent No. 2,624,417, issued January 6, 1953, there is disclosed and claimed a diaphragm formed of a felted fibrous sheet whose rim and body portions are reinforced by radially extending strands which are embedded in and bonded to the felted fibrous material. Reinforcing of the body improves the air displacement characteristics thereof to increase the efficiency of the diaphragm and to control the resonance characteristics. Reinforcing of the rim portion provides the necessary radial strength without sacrifice of lateral flexibility so that resonance can be controlled as desired and edge break-up avoided.

It is one of the objects of the present invention to provide a reinforced acoustic diaphragm and method of making the same in which the diaphragm is reinforced by a plurality of circumferentially spaced filaments of plastic material extending radially across the diaphragm body portion and rim and adhering to the felted fibrous material of which the diaphragm is formed.

According to one feature of the invention the filaments of plastic material may be pressed into the felted sheet to be embedded in the surface thereof.

Another object is to provide a method according to which plastic material is deposited on the sheet of felted fibrous material of which the diaphragm is formed in a plurality of circumferentially spaced filaments and is then set.

The plastic material may be thermoplastic applied in heated condition and cooled to set it or may be softened by a solvent and set by evaporating the solvent.

According to another feature of the invention the felted diaphragm sheet may be masked to control application of the plastic thereto quickly and easily.

The above and other objects and features of the invention will be more readily apparent from the following description when read in connection with the accompanying drawing in which:

Figure 1 is an elevation of a diaphragm embodying the invention.

Figure 2 is an enlarged partial cross section.

Figure 3 is a view similar to Figure 2 showing an alternative construction; and

Figures 4 and 5 are views similar to Figure 2, illustrating the steps in alternative methods of making the diaphragms.

The diaphragm as shown in Figure 1 may comprise a sheet of felted fibrous material formed with a concave body portion 10, which is preferably conical and which terminates at its apex in a cylinder cup-shaped extension 11 to carry a speaker coil. The body of the diaphragm terminates at its periphery in a laterally extending annular rim 12, which may be corrugated as in conventional diaphragm constructions to increase its flexibility.

According to the present invention the diaphragm is reinforced by a plurality of radially extending filaments 13 formed of plastic material. The filaments extend across the rim 12 and across all or a part of the body 10 as desired to provide the desired degree of stiffness in the body portion, and the desired degree of strength and stiffness in the rim portion. Certain of the filaments may be relatively short, as shown, to extend only partially across the body while others may extend diametrically completely across the diaphragm. The filaments in the body portion stiffen and reinforce the concave body to improve its air displacement characteristics and to control the resonance of the diaphragm. The filaments extending across the rim portion impart thereto the necessary radial strength to support the diaphragm properly while providing the necessary flexibility to permit the body portion of the diaphragm to vibrate in the desired manner.

As shown in Figure 2, the filaments 13 may be formed by relatively narrow strips of plastic material supported on the surface of the felted fibrous sheet from which the diaphragm is formed and adhesively secured thereto. This construction can readily be achieved by forming the sheet to its completed form in which it is compressed and dried and then depositing the plastic filaments thereon and setting them. It is contemplated that the plastic filaments may be formed of a thermoplastic resinous material applied in heated condition to the diaphragm sheet and then cooled to set it. Alternatively, a resinous plastic material may be employed which is softened by the addition of the solvent so that it can be applied to the diaphragm sheet and which is then set by evaporating the solvent.

Instead of the filaments being disposed on the surface of the sheet, as indicated in Figure 2, they may be embedded therein as illustrated in Figure 3. As shown in this figure, the diaphragm sheet 10' has the plastic filaments 13' pressed into its surface to lie substantially flush therewith. This construction may be made by depositing the fibrous material to form the sheet and depositing the plastic material in filament form thereon while the fibrous material is still soft. The mixture may then be pressed in a mold to compress and smooth the fibrous material and to press the plastic filaments into the surface thereof as shown in Figure 3.

In order to facilitate depositing of the plastic material on the felted fibrous sheet, it is contemplated that a mask be used as shown in Figures 4 and 5. The mask may take the form of a metallic sheet 14 shaped to fit closely against one surface of the diaphragm sheet illustrated at 10. The sheet 14 may be formed with a series of relatively narrow slots 15 therein which can be filled with plastic material to form the filaments.

Figure 4 illustrates a process of applying a thermoplastic material in heated condition or a resinous plastic softened to putty consistency by a solvent. As shown, such material may be deposited over the mask 14 and excess material scraped from the mask by a doctor blade 16 to leave the slots 15 filled flush with the surface of the mask. Thereafter the mask may be removed and the plastic material set and the diaphragm will be completed.

Instead of the process described above the slots 15 may be filled as shown in Figure 5 by spraying plastic material into them from one or more spray nozzles 17. When spray nozzles are used it may be possible in many cases to omit the mask and deposit narrow strips of plastic material directly from the nozzles onto the blank. Either a thermoplastic resin is used which is heated sufficiently to make it soft enough to spray or a solvent may be added to the plastic resin to soften it sufficiently for spraying. A sufficient quantity of plastic material is sprayed in either case to fill the slots 15, and after drying or at least partial setting of the plastic material, the mask can be removed.

The diaphragm may be formed in the usual manner by depositing the fibrous material and compressing it in a mold before the reinforcing filaments are applied, this method being preferred when the filaments are on the surface of the diaphragm as shown in Figure 2. When the filaments are to be embedded as shown in Figure 3 they are deposited on the soft fibrous blank which is then pressed in a mold to complete the diaphragm and force the filaments into its surface.

The completed diaphragm provides a concave body portion adequately reinforced to provide the necessary degree of stiffness and strength and a rim portion having the requisite radial strength to support the diaphragm and at the same time with the necessary flexibility for proper operation. The diaphragm can be manufactured easily and inexpensively in the manner described above.

Also by controlling the areas or patterns on the diaphragm on which the plastic material is deposited, it is possible to vary the resonance accurately over a wide range. Thus, in addition to the filaments or strips extending radially across the rim it may be desirable to coat the central portion or all of the concave body portion or to form annular strips or filaments on the body portion. As examples of these types of coating the diaphragm of Figure 1 is shown as formed with an annular strip or filament 18 of plastic material and with coated areas 19 between the strip 18 and the rim to stiffen the concave body portion.

While the invention has been disclosed in connection with one particular type of diaphragm it will be understood that this disclosure is for the purpose of illustration only and is not to be taken as a definition of the scope of the invention, reference being had for that purpose to the appended claims.

What is claimed is:

1. An acoustic diaphragm having a concave body portion and a peripheral mounting rim extending laterally of the body portion, said body and rim portions being integrally formed of felted fibrous material in a relatively thin flexible continuous sheet, and a plurality of separate filaments extending radially across the rim and body portions and circumferentially spaced from each other, each of said filaments being formed by a strip of resinous plastic material adhesively secured to the fibrous sheet.

2. An acoustic diaphragm having a concave body portion and a peripheral mounting rim extending laterally of the body portion, said body and rim portions being integrally formed of felted fibrous material in a relatively thin flexible continuous sheet, and a plurality of separate filaments extending radially across the rim and body portions and circumferentially spaced from each other, each of said filaments being formed by a strip of resinous plastic material adhesively secured to the fibrous sheet and projecting above the surface of the sheet.

3. An acoustic diaphragm having a concave body portion and a peripheral mounting rim extending laterally of the body portion, said body and rim portions being integrally formed of felted fibrous material in a relatively thin flexible continuous sheet, and a plurality of separate filaments extending radially across the rim and body portions and circumferentially spaced from each other, each of said filaments being formed by a strip of resinous plastic material adhesively secured to the fibrous sheet and embedded in the sheet so that its outer surface lies substantially flush with the surface of the sheet.

4. The method of making acoustic diaphragms which comprises forming a continuous felted fibrous sheet into a diaphragm with a concave body portion and a peripheral mounting rim extending laterally of the body portion, depositing resinous material on the sheet in the form of a plurality of spaced filaments extending radially across the rim and body portions of the diaphragm, and setting the resinous material.

5. The method of making acoustic diaphragms which comprises forming a continuous felted fibrous sheet into a diaphragm with a concave body portion and a peripheral mounting rim extending laterally of the body portion, depositing resinous material on the sheet in the form of a plurality of spaced filaments extending radially across the rim and body portions of the diaphragm, pressing the filaments into the sheet to embed them in the surface thereof, and setting the resinous material.

6. The method of making acoustic diaphragms which comprises forming a continuous felted fibrous sheet into a diaphragm with a concave body portion and a peripheral mounting rim extending laterally of the body portion, depositing heated thermoplastic resinous material on the sheet in the form of a plurality of circumferentially spaced filaments extending radially across the body portion and rim, and cooling the thermoplastic material to set it.

7. The method of making acoustic diaphragms which comprises forming a continuous felted fibrous sheet into a diaphragm with a concave body portion and a peripheral mounting rim extending laterally of the body portion, depositing heated thermoplastic resinous material on the sheet in the form of a plurality of circumferentially spaced filaments extending radially across the body portion and rim, pressing the filaments into the sheet to embed them in the surface thereof and simultaneously to compress the sheet, and cooling the thermoplastic material to set it.

8. The method of making acoustic diaphragms which comprises forming a continuous felted fibrous sheet into a diaphragm with a concave body portion and a peripheral mounting rim extending laterally of the body portion, depositing on the sheet a resinous plastic material softened by a volatile solvent in the form of a plurality of circumferentially spaced filaments extending radially across the body portion and rim, and evaporating the solvent from the resinous material to set it.

9. The method of making acoustic diaphragms which comprises forming a continuous felted fibrous sheet into a diaphragm with a concave body portion and a peripheral mounting rim extending laterally of the body portion, masking one surface of the sheet to leave exposed only a plurality of circumferentially spaced narrow strips extending radially across the body portion and rim, covering the exposed strips with resinous plastic material to form plastic filaments extending radially across the body portion and rim, and removing the masking.

10. The method of making acoustic diaphragms which comprises forming a continuous felted fibrous sheet into a diaphragm with a concave body portion and a peripheral mounting rim extending laterally of the body portion, covering one surface of the sheet with a relatively thin mask formed with a plurality of circumferentially spaced narrow slots therein extending radially across the body portion and rim, filling the slots with resinous plastic material to form on the sheet a plurality of filaments extending radially across the body portion and rim, and removing the mask from the sheet.

References Cited in the file of this patent

UNITED STATES PATENTS

| | | |
|---|---|---|
| 1,246,552 | Cookson | Nov. 13, 1917 |
| 1,742,398 | Kelley | Jan. 7, 1930 |
| 1,745,405 | Clement | Feb. 4, 1930 |
| 1,997,790 | Heidrich | Apr. 16, 1935 |
| 2,037,666 | Pennington | Apr. 14, 1936 |
| 2,294,480 | Rohweder et al. | Sept. 1, 1942 |